United States Patent [19]
Ziemann et al.

[11] 3,893,885
[45] July 8, 1975

[54] AUXILIARIES FOR THE MANUFACTURE OF PAPER

[75] Inventors: Heinz Ziemann, Leichlingen; Gerhard Troemel, Peach near Cologne; Wolfgang Lehmann, Leverkusen, all of Germany

[73] Assignee: Bayer Aktiengesellschaft, Leverkusen-Bayerwerk, Germany

[22] Filed: Nov. 23, 1973

[21] Appl. No.: 418,205

Related U.S. Application Data

[63] Continuation of Ser. No. 840,051, July 8, 1969, abandoned.

[30] Foreign Application Priority Data

July 16, 1968 Germany............................ 1771814

[52] U.S. Cl. .............. 162/164; 162/190; 260/78 A; 260/78 SC
[51] Int. Cl............................................. D211 3/58
[58] Field of Search.................... 162/164, 168, 190; 260/78 SC, 78 A

[56] References Cited
UNITED STATES PATENTS
3,250,664  5/1966  Conte et al. ........................ 162/164

FOREIGN PATENTS OR APPLICATIONS
1,035,296  7/1966  United Kingdom

Primary Examiner—S. Leon Bashore
Assistant Examiner—William F. Smith
Attorney, Agent, or Firm—Plumley & Tyner

[57] ABSTRACT

Process for preparing paper and paper making compositions characterized by adding basic polyamides which are high-molecular water-soluble reaction products have been obtained by the reaction of compounds which are polyfunctional with regard to amino groups, with basic polyamides which are dissolved or dispersed in water and are derived from polyvalent amines, dicarboxylic acids and amino-carboxylic acids containing at least 3 carbon atoms, or their lactams, and for the preparation of said reaction products has been used 0.6–0.01 gram equivalent of reactive groups in the polyfunctional compounds for every gramequivalent of basic amino groups in the basic polyamides.

5 Claims, No Drawings

AUXILIARIES FOR THE MANUFACTURE OF PAPER

This is a continuation, of application Ser. No. 840,051, filed July 8, 1969 and abandoned.

The present invention relates to auxiliaries for increasing the retention of fibres, fillers and pigments in the manufacture of paper, for accelerating the dehydration of suspensions of paper raw materials, and for working up waste waters from paper machines by filtration, sedimentation and flotation. More particularly the present invention relates to auxiliaries containing water-soluble reaction products which have been obtained by the reaction of compounds which are polyfunctional with regard to amino groups, with basic polyamides which are dissolved or dispersed in water and are derived from polyvalent amines, dicarboxylic acids and amino-carboxylic acids containing at least 3 carbon atoms, or their lactams; said reaction products having been prepared with the use of less than 1 gram-equivalent of reactive groups in the polyfunctional compounds for every gram-equivalent of basic amino groups in the basic polyamides.

The present invention also relates to a process for increasing the retention of fibres, fillers and pigments in the manufacture of paper, for accelerating the dehydration of paper raw materials, and for working up waste water from paper machines. More particularly the present invention relates to a process which consists in that the suspension of paper raw material and/or waste waters from paper machines are admixed with high-molecular watersoluble reaction products which have been obtained by the reaction of compounds which are polyfunctional with regard to amino groups, with basic polyamides which are dissolved or dispersed in water and are derived from polyvalent amines, dicarboxylic acids and amino-carboxylic acids containing at least 3 carbon atoms, or their lactams, said reaction products having been prepared with the use of less than 1 gram-equivalent of reactive groups in the polyfunctional compounds for every gram-equivalent of basic amino groups in the basic polyamides.

The water-soluble or water-dispersible basic polyamides wherein the whiteness of the paper is not adversely affected by the increased retentive effects from which the reaction products to be used according to the invention are derived, are reaction products obtained from a. aliphatic, cycloaliphatic, araliphatic or heterocyclic polyamines containing at least two amino groups capable of forming amides and at least one further primary, secondary or tertiary amino group; these polyamines may be present in mixture with aliphatic, cycloaliphatic, araliphatic or heterocyclic diamines containing primary or secondary amino groups, the amount of these diamines being advantageously so calculated that up to 20 molar percent of diamines are present for every mol of further primary, secondary or tertiary amino groups contained in the polyamines in excess of the minimum of at least two amino groups capable of amide formation;

b. aliphatic or aromatic dicarboxylic acids, particularly saturated aliphatic dicarboxylic acids containing 4 to 10 carbon atoms, or their functional derivatives such as anhydrides, esters, semiesters or amides; and c. aminocarboxylic acids containing at least 3 carbon atoms, or their lactams.

Polyamines (a) which contain at least two amino groups capable of amide formation and at least one further primary, secondary or tertiary amino group, are, for example: ethylbis-(3-amino-propyl)-amine, 2-hydroxyethyl-bis-(3-amino-propyl)-amine, 1,3-bis-(2-amino-ethylamino)-propane, N-(3-amino-propyl)-tetramethylene-diamine, N,N'-bis-(3-amino-propyl)-tetramethylenediamine, 1,6-bis-(2-amino-ethylamino)-hexane, 1,6-bis-(3-aminopropylamino)-hexane, bis-(6-amino-n-hexyl)-amine, methyl-bis(3-amino-propyl)-amine, 3-(3-diethylamino-propylamino)propylamine, tris-(3-amino-propyl)-amine, 2,2'-bis-(2-aminoethylamino)-diethyl ether, 1,-4-bis-(3-amino-propylamino)cyclohexane, benzyl-bis-(3-amino-propyl)-amine, N,N'-bis-(3-amino-propyl)-1,3-diaminomethyl-benzene, 1,3-bis-(3-amino-propylamino-methyl)-benzene, and N-(2-amino-ethyl)-piperazine, but primarily polyalkylene-polyamines of the formula

wherein
A denotes a $C_2 - C_8$-alkylene radical
$R_1$ and $R_2$, independently of one another, denote hydrogen or a $C_1 - C_{10}$-alkyl radical which may be substituted by a hydroxy or amino group; and
n denotes a number from 2 to 5, e.g., di-propylene-(1,2)-triamine, tri-propylene-(1,2)-tetramine and, in particular, diethylene-triamine, triethylene-tetramine, tetraethylene-pentamine or bis-(3-amino-propyl)-amine.

The aliphatic, cycloaliphatic, araliphatic or heterocyclic diamines which may be used for the production of the water-soluble basic polyamides, in addition to the polyamines, are, for example: ethylene-diamine, N-(2-hydroxyethyl)-ethylene-diamine, N,N'-dimethyl-ethylene-diamine, 1,2-diamino-propane, 1-amino-3-methyl-amino-propane, 1,6-diaminohexane, 1,4-diamino-cyclohexane, 1,3-bis-aminomethyl-benzene and piperazine.

Examples of dicarboxylic acids are: saturated aliphatic dicarboxylic acids, such as succinic acid, glutaric acid, adipic acid or sebacic acid; unsaturated aliphatic dicarboxylic acids, such as maleic acid or fumaric acid; aliphatic ether-dicarboxylic acids, such as diglycollic acid; and aromatic dicarboxylic acids, such as isophthalic acid or terephthalic acid.

Examples of aminocarboxylic acids or their lactame are: 3-amino-3,3-dimethyl-propionic acid, 4-amino-butanic acid, 6-amino-hexanic acid, 8-amino-octanic acid, 11-amino-undecanic acid, and 12-amino-dodecanic acid, or 3,3-dimethyl-acetidinone(2),pyrrolidone-(2), 6-caprolactam, 8-caprylolactam, 11-undecanolactam and 12-dodecanolactam.

The proportions of the components concerned, which have to be observed to produce suitable polyamides, can easily be established for every case by preliminary experiments. In general, the reaction products to be used according to the invention are derived from polyamides for the preparation of which the polyvalent amines, dicarboxylic acids and aminocarboxylic acids or their lactams have been reacted in molar proportions of about 0.8–1.6 : 1 : 0.1–4, preferably in molar proportions of about 1–1.2 : 1 : 0.1–2. The lower the molar ratio between the polyvalent amines of the type mentioned under (a), on the one hand, and the other polyamide-forming components mentioned above, on the other hand, the lower is the content of basic nitrogen in the resultant polyamides. By appropriately selecting the components and the molar proportions, the content of basic nitrogen in the polyamides can thus arbitrarily be varied within certain limits; in particular, it can be reduced to the desired extent so that the reaction products to be used according to the invention have optimal properties on account of their low content of cationic groups.

The polyamides can be prepared in the usual way, for example, by heating the components concerned with the exclusion of oxygen for several hours at temperatures of 150°–250°C, initially under normal pressure and then under reduced pressure; small amounts of hydrazine hydrate or hydrazides may be added to avoid an excessive dark colouration of the polyamides.

Compounds which are polyfunctional with regard to amino groups and suitable for the preparation of the reaction products to be used according to the invention are primarily those bi- or polyfunctional compounds which are capable of completely reacting in an aqueous solution at pH values above 6, preferably above 8, with the amino groups contained in the basic polyamides. Compounds which are polyfunctional with regard to amino groups are, for example, $\alpha,\omega$-alkyl-dihalides, such as 1,2-dichloroethane, 1,2-dibromoethane, 1,2-dichloropropane, 1,3-dichloropropane, 1,6-dichlorohexane; $\omega,\omega'$-dihalogen ethers, such as 2,2'-dichloro-diethyl ether, bis-($\beta$-chloro-isopropyl)-ether, bis-(4-chloro-butyl ether); halohydrins or epihalohydrins, such as epichlorohydrin, 1,3-dichloro-propanol-(2), bis-(3-chloro-2-hydroxypropyl) ether, 1,4-dichloro-2,3-epoxybutane; bis-epoxy compounds, such as 1,2,3,4-diepoxybutane, diglycidyl ether, ethane-1,2-bis-glycidyl ether, butane-1,4-bis-glycidyl ether; $\omega$-halocarboxylic acid halides, such as chloroacetyl chloride, 2-chloropropional chloride, 3-chloropropionyl chloride, 3-bromopropionyl bromide; vinyl compounds, such as divinyl ether, divinyl sulphone, methylene-bisacrylamide, N,N',N''-triacryloyl-hexahydro-a-triazine; furthermore, 4-chloromethyl-1,3-dioxolanone-(2) and 2-chloro-ethylchloroformic acid ester; and also hydrohalic acid esters, alkyl- or aryl-sulphonic acid esters, sulphonic acid semi esters, chloroformic acid esters, 3-chloro-2-hydroxypropyl ethers and glycidyl ethers of polyalkylene-oxides, e.g., polyethylene oxides, and of reaction products obtained from 1 – 50 mol of an alkylene oxide, such as ethylene oxide and/or propylene oxide, with 1 mol of bi- or polyhydric polyols or other compounds containing at least two active hydrogen atoms.

Reaction products suitable for being used according to the invention are also those which are derived from mixtures of the various components mentioned above, instead of from uniform starting materials.

To prepare the reaction products to be used according to the invention, the compounds which are polyfunctional with regard to amino groups are reacted with the basic polyamides in such a proportion that less than 1 gram-equivalent, e.g., 0.9 – 0.01 gram-equivalent, preferably 0.6 – 0.01 gram-equivalent, of the reactive groups contained in the polyfunctional compounds is present for every gram-equivalent of basic amino groups in the polyamides.

The proportions are expediently so chosen that the minimum amounts of compounds which are polyfunctional with regard to amino groups, required for multiplication of the molecular weight of the basic polyamides, is not substantially exceeded. The minimum amounts to be used of compounds which are polyfunctional with regard to amino groups, in order to obtain reaction products with the desired high molecular weight, or solutions thereof with the desired viscosity, chiefly depend on the molecular weight of the basic polyamides and can easily be established for every case by preliminary experiments.

The reaction products to be used according to the invention can be prepared by known methods, for example, by stirring mixtures consisting of basic polyamides and of compounds which are polyfunctional with regard to amino groups, at a total concentration of 10 – 50 per cent by weight in an aqueous medium at pH values above 6 and at temperatures between 0° and 95°C until a sample of the reaction mixture in the form of a 10% aqueous solution has a viscosity of at least 20 cp at 25°C. The compounds which are polyfunctional with regard to amino groups may also gradually be added to the aqueous polyamide solution in several portions. The content of reaction products in the reaction solution, which is preferably between 10 and 25 percent by weight, is then adjusted to the desired final value by dilution with water, if the reaction has been carried out at a higher concentration. In some cases it is advisable, in order to terminate the reaction when the desired viscosity has been achieved, to adjust the pH value of the reaction solution to pH 6, preferably to pH 4 – 5, by the addition of acid, for example, hydrochloric acid, sulphuric acid, phosphoric acid or acetic acid.

In order to increase the retention of the fibres, fillers and pigments, as well as the dehydration speed of suspensions of paper raw material in the formation of the paper web, with the aid of the reaction products to be used according to the present invention, a known procedure can be followed, preferably in that the reaction products concerned are added in the form of dilute aqueous solutions to the suspension of the paper raw material before the breast box, the dosing point being so chosen as to ensure a good distribution of the auxiliary in the raw material suspension while obviating too long a contact time. The amounts of reaction products required to achieve the desired retentive and/or dehydration-accelerating effect, can be accomplished without difficulty by preliminary experiments; in general, it is recommended to use 0.01 – 0.5 percent by weight of the reaction products, referred to the dry weight of the paper. The addition of the reaction products to be used according to the invention before the breast box of a paper machine, moreover, advantageously affects the processing of the waste water from the paper machine by filtration, flotation or sedimentation; the coagulative effect of the reaction products very substantially facilitates the separation of components of paper raw material from the waste water of the paper machine.

When using the reaction products according to the invention as auxiliaries for the processing of waste water from paper machines by filtration, flotation or sedimentation, a known procedure can again be followed, preferably in that the reaction products concerned are added in the form of dilute aqueous solutions to the waste water from the paper machine, expediently before entry into the pulp saver.

The amounts of reaction products which lead to a sufficient coagulation of the paper raw material contained in the waste water from the paper machine, are to be calculated in accordance with the composition of the waste water and can easily be established for every case by preliminary experiments; in general, amounts of 0.01 to 2 g of reaction product per $m^3$ waste water will be sufficient.

The paper auxiliaries of the present invention have many uses and are highly effective. Their effect is substantially independent of the pH value of the aqueous suspensions of the paper raw material or the waste water from the paper machine, and also of the type of cellulose, pigments and fillers serving as raw materials for the paper manufacture. It is noteworthy that the reaction products to be used according to the invention have virtually no adverse effect on the degree of whiteness of the paper, especially of paper produced from bleached cellulose, and that they are also very well compatible with the optical whiteners frequently used for the brightening of paper. This applies also to their use as auxiliaries for the processing of waste water from paper machines which are usually recycled, completely or in part, to the suspensions of paper raw material. Furthermore, the reaction products in question can also be combined with other additives conventionally used in the manufacture of paper, for example, with wet strengtheners, natural or synthetic sizing agents, and water-soluble dyestuffs without an adverse mutual effect. In particular, the products are also suitable fixing agents for soluble paper dyestuffs which contain anionic groups. The hitherto known paper auxiliaries do not have these valuable effects and properties to the same extent.

The reaction products used in the following Examples have been obtained in the following way:

Reaction product 1 a. 108 g (1.05 mol) diethylene-triamine are mixed in a reaction vessel with gas feed tube and descending cooler with 146 g (1 mol) adipic acid and 57 g (0.5 mol) ε-caprolactam with the addition of 7 g (0.04 mol) adipic acid dihydrazide. The mixture is heated to 190°C within 3 to 4 hours, while stirring and passing over oxygen-free nitrogen; in the range from 150 to 190°C the temperature is raised to such an extent that the water formed distills off at a uniform rate. When about 35 g of water and small amounts of diethylene-triamine have distilled off, the reaction mixture is further stirred at 190° to 180°C under reduced pressure (20 – 50 mm Hg) until a total of 50 g of distillate have been obtained; the reaction mixture is then cooled to 130°C and mixed with the same amount by weight (270 g) of water. The resultant 50% aqueous solution of the basic polyamide has a viscosity of 350 – 500 cp at 25°C and an equivalent weight of about 420.

b. A mixture of 420 g (1 gram-equivalent) of this 50% polyamide solution, 428 g of water and 16.8 g (0.17 mol) 1,2-dichloro-ethane is heated in a reaction vessel with reflux condenser to 80° – 90°C and stirred at this temperature until the viscosity of the reaction solution has risen to about 250 cp at 80°C; this is usually the case after 6 – 8 hours. The solution is then mixed with 150 g of water and 60 g of concentrated hydrochloric acid, and cooled. The resultant 20% aqueous solution of the reaction produce formed has a pH value of 4 – 5 and a viscosity of 200 – 300 cp at 25°C.

Reaction product 2

A mixture of 420 g (1 gram-equivalent) of the 50% solution of the reaction product 1(a), 445 g of water and 25 g (0.16 mol) 1,6-dichloro-n-hexane is heated to 85° – 90°C and stirred at this temperature until the reaction solution has a viscosity of about 200 cp; this is usually the case after 20 to 25 hours. The solution is then mixed with 225 g of water and cooled. The resultant 20% solution of the reaction product formed has a pH value of 9 and a viscosity of 150 – 250 cp at 25°C.

Reaction product 3

A mixture of 420 g (1 gram-equivalent) of the 50% solution of the reaction product 1 a, 658 g of water and 192 g (0.3 mol) of the dichloride of polyethyleneglycol (molecular weight 600) is heated to 90° – 95°C and stirred at this temperature until the viscosity of the reaction solution has risen to about 300 cp at 90°C; this is the case after a reaction time of 25 hours. The solution is then mixed with 635 g of water and cooled. The resultant 20% aqueous solution of the reaction product formed has a pH value of 9 and a viscosity of 100 – 200 cp at 25°C.

Reaction product 4

A mixture of 420 g (1 gram-equivalent) of the 50% solution of the reaction product 1 a, 555 g of water and 45 g (0.145 gram-equivalent) of a triglycidyl ether prepared from 1 mol trimethylol-propane, 10 mol ethylene oxide and 3 mol epichlorohydrin and having an epoxide equivalent of 310, is stirred at 60° – 65°C until the viscosity of the reaction solution has risen to about 150 cp at 65°C. The solution is then mixed with 175 g of water and 80 g of concentrated hydrochloric acid, and cooled. The resultant 20% aqueous solution of the reaction product formed has a pH value of 4 – 5 and a viscosity of 100 – 200 cp at 25°C.

Reaction product 5 a. 108 g (1.05 mol) diethylene-triamine, 146 g (1 mol) adipic acid and 113 g (1.0 mol) ε-caprolactam are reacted with the addition of 7 g (0.04 mol) adipic acid dihydrazide, as described for the preparation of the reaction product 1(a), to form a basic polyamide. The 50% polyamide solution obtained after the addition of an equal amount by weight of water has a viscosity of 600 cp at 25°C and an equivalent weight of 480.

b. A mixture of 480 g (1 gram-equivalent) of this 50% polyamide solution, 485 g of water and 19.8 g (0.2 mol) 1,2-dichloroethane is stirred in a reaction vessel with reflux condenser at 80°– 90°C until the viscosity of the reaction solution has risen to about 200 cp at 80°C; this is the case after a reaction time of 6– 8 hours. The solution is then mixed with 165 g of water and 80 g of concentrated hydrochloric acid, and cooled. The resultant 20% aqueous solution of the reaction product formed has a pH value of 4 – 5 and a viscosity of 150 – 250 cp at 25°C.

Reaction product 6 a. 108 g (1.05 mol) diethylene-triamine, 146 g (1 mol) adipic acid, and 226 g (2 mol) ε-caprolactam are reacted with the addition of 7 g (0.04 mol) adipic acid dihydrazide, as described for the preparation of the reaction product 1(a), to form a basic polyamide. The 50% polyamide solution which is obtained after the addition of an equal amount of water and is transformed into a paste-like polyamide suspension by prolonged standing at room temperature, has an equivalent weight of 550.

b. A mixture of 550 g (1 gram-equivalent) of this 50% polyamide dispersion, 540 g of water, 10 g of concentrated hydrochloric acid, and 29.8 g (0.3 mol) 1,2-dichloroethane is stirred in a reaction vessel with reflux condenser at 80°– 90°C until the viscosity of the reaction solution has risen to about 200 cp at 85°C; this is the case after a reaction time of 10 to 12 hours. The solution is then mixed with 250 g of water and 35 g of concentrated hydrochloric acid, and cooled. The resultant 20% clear aqueous solution of the reaction product formed has a pH value of 4 to 5 and a viscosity of 150 to 250 cp at 25°C.

Reaction product 7 a. 161 g (1.1 mol) triethylene-tetramine, 146 g (1 mol) adipic acid, and 282 g (2.5 mol) $\epsilon$-caprolactam are reacted with the addition of 7 g (0.04 mol) adipic acid dihydrazide, as described for the preparation of the reaction product 1a, to form a basic polyamide. The 50% polyamide solution obtained after the addition of an equal amount of water has a viscosity of 400 to 500 cp at 25°C and an equivalent weight of 450.

b. A mixture of 450 g (1 gram-equivalent) of this 50% polyamide solution, 455 g of water, and 19.8 g (0.2 mol) 1,2-dichloroethane is stirred in a reaction vessel with reflux condenser at 80°– 90°C until the viscosity of the reaction solution has risen to about 300 cp at 80°C; this is the case after a reaction time of 3 to 5 hours. The solution is then mixed with 100 g of water and 130 g of concentrated hydrochloric acid, and cooled. The resultant 20% aqueous solution of the reaction product formed has a pH value of 4 – 5 and a viscosity of 250 to 350 cp at 25°C.

Reaction product 8 a. 130 g (0.9 mol) methyl-bis-(3-amino-propyl)-amine, 17.5 g (0.15 mol) 1,6-diamino-hexane, 146 g (1 mol) adipic acid and 56.5 g (0.5 mol) $\epsilon$-caprolactam are reacted with the addition of 7 g (0.04 mol) adipic acid dihydrazide, as described for the preparation of the reaction product 1(a), to form the corresponding basic polyamide. The 50% polyamide solution obtained after the addition of an equal amount of water has a viscosity of 400 to 500 cp at 25°C and an equivalent weight of 520.

b. A mixture of 520 g (1 gram-equivalent) of this 50% polyamide solution, 550 g of water, and 9 g (0.04 mol) butane-1,4-bis-glycidyl ether is stirred at 50° until the viscosity of the reaction solution has risen to about 250 cp at 50°C; this is the case after a reaction time of one-half hour. The solution is then mixed with 200 g of water and 70 g of concentrated hydrochloric acid, and cooled. The resultant 20% solution of the reaction product formed has a pH value of 4 to 5 and a viscosity of 200 to 250 cp at 25°C.

Reaction product 9 a. 129 g (1 mol) N-2-aminoethyl-piperazine, 146 g (1mol) adipic acid, and 56.5 g (0.5 mol) $\epsilon$-caprolactam are reacted with the addition of 7 g (0.04 mol) adipic acid dihydrazide, as described for the preparation of the reaction product 1a, to form a basic polyamide. The 50% polyamide solution obtained after the addition of an equal amount of water has a viscosity of 900 – 100 cp at 25°C and an equivalent weight of 540.

b. A mixture of 540 g (1 gram-equivalent) of this 50% polyamide solution, 668 g of water, and 42 g (0.45 mol) epichlorohydrin is stirred at 60 to 70°C until the viscosity of the reaction solution has risen to about 150 cp at 65°C: this is the case after a reaction time of 10 to 12 hours. The solution is then mixed with 270 g of water and 40 g of concentrated hydrochloric acid, and cooled. The resultant 20% solution of the reaction product formed has a pH value of 4 to 5 and a viscosity of 100 to 120 cp at 25°C.

EXAMPLE 1

200 kg of a 0.5% aqueous suspension of a paper raw material consisting of

| 700 | parts by weight of | bleached | pine wood sulphite cellulose |
| 300 | " | " | leaf wood sulphite cellulose |
| 200 | " | | China clay |
| 50 | " | | titanium dioxide |
| 10 | " | | a commercial 50% resin size |
| 20 | " | | $Al_2(SO_4)_3 \cdot 18 H_2O$, and |
| 1.5 | " | | a commercial whitening agent. | are processed in a laboratory paper machine (system Kammerer) with the continuous addition of 27.7 kg of water containing 1 g of the 20% aqueous solution the production of which is described above under reaction product (1), to produce paper with a surface weight of 80 g/m². An excellent retention of fine fibres and pigments is achieved with the aid of the added reaction product. Moreover, the degree of whiteness of the paper is reduced only to a very slight extent.

If the 20% aqueous solution of the reaction product 1 is replaced with a 20% aqueous solution of one of the reaction products 2 to 9 described above, these give also rise to an excellent retention of fine substances, and the papers also have a high degree of whiteness.

The retentive effect of the reaction products 1 to 9 is summarised in the following Table 1. The measure of the retentive effect is the ash content of the paper and the content of dry residue in the waste water. Table 1 also shows the influence of the reaction products on the degree of whiteness of the paper. Furthermore, Table 1 illustrates the technical advance which is achieved with the reaction products to be used according to the invention, compared with the most closely related paper auxiliaries belonging to the state of the art. The product I mentioned in the Table is the reaction product of epichlorohydrin with the water-soluble basic polyamide from tetraethylene-pentamine and adipic acid prepared according to Example 1 of British Pat. No. 1.035,296, and product II is the reaction product of an excess of epichlorohydrin with the water-soluble basic polyamide from diethylene-triamine, triethylene-tetramine, $\epsilon$-caprolactam and adipic acid prepared according to Example 2 of U.S. Pat. No. 3,320,215.

Table 1

Retentive effect of the reaction products (1) to (9) and of the products I and II

| Reaction product | Ash content of the paper as % by weight | Dry residue in the waste water as g/ltr | Degree of whiteness of the paper* |
|---|---|---|---|
| ohne | 11.7 | 0.878 | 108.3 |
| 1 | 16.8 | 0.325 | 104.2 |
| 2 | 16.5 | 0.367 | 104.5 |
| 3 | 16.0 | 0.385 | 104.7 |
| 4 | 16.3 | 0.352 | 104.9 |
| 5 | 16.1 | 0.336 | 105.0 |
| 6 | 15.9 | 0.390 | 105.2 |
| 7 | 16.6 | 0.305 | 103.6 |
| 8 | 16.7 | 0.310 | 103.2 |
| 9 | 16.8 | 0.313 | 104.3 |
| I | 15.6 | 0.486 | 97.4 |
| II | 15.0 | 0.514 | 102.1 |

*measured with the Elrepho apparatus of the firm Carl Zeise; the degree of whiteness (W) was calculated according to the equation $W = R_y - 3(R_x - R_z)$, in which the magnitudes $R_x$, $R_y$ and $R_z$ denote the degree of remission of the standard colour values X, Y and Z. Magnesium oxide powder served as white standard.

EXAMPLE 2

The degree of grinding of the cellulose of a 0.2% suspension of waste paper ground until slimy is determined in the usual way according to Schopper and Riegler. Portions of 1 kg of the suspension are then mixed with 4 g and 8 g, respectively, of a 0.02% aqueous solution of the product the preparation of which in the form of a 20% aqueous solution is described above under reaction product 1. After stirring, the degree of grinding of the cellulose is again determined under the same conditions. By the addition of the reaction product 1 the degree of grinding of the paper raw material used is substantially reduced and a more rapid dehydration of the paper web formed is thus achieved in the paper manufacture.

If the 0.02% aqueous solution of the reaction product 1 is replaced with a 0.02% aqueous solution of one of the reaction product 2 to 9 described above, these give also rise to a substantial reduction of the degree of grinding.

The values for the reduction of the degree of grinding achieved with the aid of the reaction products 1 to 9 are assembled in the following Table 2.

Table 2

Reduction of degree of grinding of waste paper cellulose by the addition of the reaction products (1) to (9)

| Reaction product | Reduction of degree of grinding as % referred to the initial degree of grinding with an addition of | |
|---|---|---|
| | 4 g | 8 g |
| | of the 0.02% solutions of the reaction products on 1 kg of a 0.02% cellulose suspension | |
| 1 | 15.0 | 21.6 |
| 2 | 13.3 | 20.0 |
| 3 | 11.7 | 18.3 |
| 4 | 11.7 | 18.3 |
| 5 | 13.3 | 20.0 |
| 6 | 11.7 | 18.3 |
| 7 | 16.6 | 21.6 |
| 8 | 15.0 | 20.0 |
| 9 | 13.3 | 18.3 |

EXAMPLE 3

To the waste waters which are obtained in the production of sized and unsized weighted packing paper (raw material: waste paper) and have a pH value of 4.5 – 4.8 and 7.0 – 7.3, respectively, there is added, before the entry into the flotation pulp saver, per m³ waste water 2 g of the 20% aqueous solution of the product the preparation of which is described above under reaction product 1. An excellent clarification is achieved in both cases, and the solids content in the waste water is reduced from about 1,600 mg/1 tr. to 20 – 30 mg/1tr. The clear water obtained can be further used as diluting water in the production of optically brightened paper.

If the 20% aqueous solution of the reaction product 1 is replaced with a 20% aqueous solution of one of the reaction products 2 to 5 described above, an excellent clarification is again achieved. If the 20% aqueous solutions of the reaction products 1 to 9 are used in the same amounts as additives for the clarification of waste water obtained in the production of writing paper with an ash content of 8% with the addition of a commercial whitening agent, a very good flotation effect is achieved, and the degree of whiteness of the paper is not adversely affected by the fibres and filler which have been recovered and recycled as raw materials. 7.0 – 7.3, respectively, there is added, before the entry into the flotation pulp saver, per m³ waste water 2 g of the 20% aqueous solution of the product the preparation of which is described above under reaction product 1. An excellent clarification is achieved in both cases, and the solids content in the waste water is reduced from about 1,600 mg/1tr. to 20 – 30 mg/1tr. The clear water obtained can be further used as diluting water in the production of optically brightened paper.

If the 20% aqueous solution of the reaction product 1 is replaced with a 20% aqueous solution of one of the reaction products 2 to 5 described above, an excellent clarification is again achieved. If the 20% aqueous solutions of the reaction products 1 to 9 are used in the same amounts as additives for the clarification of waste water obtained in the production of writing paper with an ash content of 8% with the addition of a commercial whitening agent, a very good flotation effect is achieved, and the degree of whiteness of the paper is not adversely affected by the fibres and fillers which have been recovered and recycled as raw materials. We claim:

1. Process for increasing the retention of fibers, fillers and pigments in the manufacture of paper, for accelerating the dehydration of suspensions of paper raw material, and for processing waste waters from paper machines by filtration, sedimentation and flotation, by the addition of basic polyamides to the suspensions of paper raw material and/or to the waste waters from paper machines, which comprises adding as basic polyamides, high-molecular water-soluble reaction products which have been obtained by the reaction of compounds which are polyfunctional with regard to amino groups, with basic polyamides which are dissolved or dispersed in water and are prepared by the reaction of polyvalent amines containing at least two amino groups capable of forming amides and at least one further primary, secondary or tertiary amino group, with saturated aliphatic dicarboxylic acids containing 4 to 10 carbon atoms and with ω-amino-carboxylic acids containing 5 to 8 carbon atoms, or their lactams, and for the preparation of said reaction products there are used less than 1 gram-equivalent of reactive groups in the polyfunctional compounds for every gram-equivalent of basic amino groups in the basic polyamides using high molecular water-soluble reaction products for the preparation of which has been used 0.6 – 0.01 gram-equivalent of reactive groups in the polyfunctional compounds for every gram-equivalent of basic amino groups in the basic polyamides and wherein the whiteness of the paper is not adversely affected by the increased retentive effects.

2. Process according to claim 1, which comprises adding high-molecular water-soluble reaction products derived from basic polyamides which have been obtained by the reaction of polyvalent amines of the formula

wherein

A denotes a $C_2 - C_8$-alkylene radical, $R_1$ and $R_2$, independently of one another, denote hydrogen or a $C_1 - C_{10}$-alkyl radical which may be substituted by a hydroxy or amino group, and $n$ denotes a number from 2 to 5.

3. Process according to claim 1, which comprises adding high-molecular water-soluble reaction products derived from basic polyamides which have been obtained by the reaction of diethylene-triamine, triethylene-tetramine, tetraethylene-pentamine or bis-(3-amino-propyl)-amine.

4. Process according to claim 1, which comprises adding high-molecular water-soluble reaction products for the preparation of which there have been used, as compounds which are polyfunctional with regard to amino groups, bifunctional compounds in which the reactive groups are halogen atoms and/or epoxide groups.

5. Process according to claim 1, the use of high-molecular water-soluble reaction products for the preparation of which there have been used, as compounds which are polyfunctional with regard to amino groups, trifunctional compounds in which the reactive groups are halogen atoms and/or epoxide groups.

* * * * *

UNITED STATES PATENT OFFICE
CERTIFICATE OF CORRECTION

PATENT NO. : 3,893,885                                  Page 1 of 2

DATED : July 8, 1975

INVENTOR(S) : Heinz Ziemann, et al.

It is certified that error appears in the above–identified patent and that said Letters Patent are hereby corrected as shown below:

| COLUMN | LINE | ERROR |
|---|---|---|
| IN THE ABSTRACT, last line, after "polyamides" | | Insert--wherein the whiteness of the paper is not adversely affected by the increased retentive effects---. |
| 1 | 2 | "and abandoned" should be ---and now abandoned---. |
| 1 | 32 | "watersoluble" should be ---water-soluble---. |
| 1 | 44-45 | Delete "wherein the whiteness of the paper is not adversely affected by the increased retentive effects". |
| 2 | 4 | "ethylbis" should be ---ethyl-bis---. |
| 3 | 40 | "2-chloropropional" should be ---2-chloropropionyl---. |
| 9 | 40 | "product" should be ---products---. |
| 10 | 24-45 | Delete "7.0 through to raw materials.". |

UNITED STATES PATENT OFFICE
CERTIFICATE OF CORRECTION

PATENT NO. : 3,893,885

DATED : July 8, 1975

INVENTOR(S) : Heinz Ziemann, et al.

It is certified that error appears in the above-identified patent and that said Letters Patent are hereby corrected as shown below:

| COLUMN | LINE | ERROR |
|---|---|---|
| 11 | 21 | "-c8-" should be ---$C_8$- ---. |
| 12 | 16 | After Claim 1, delete "the use of" and insert -- which comprises adding --. |

Signed and Sealed this

Thirteenth Day of December 1977

[SEAL]

Attest:

RUTH C. MASON
Attesting Officer

LUTRELLE F. PARKER
Acting Commissioner of Patents and Trademarks